March 11, 1947.  C. L. CONROY  2,417,350
METHOD OF MANUFACTURE OF AN ADAPTOR UNION
Filed March 30, 1944
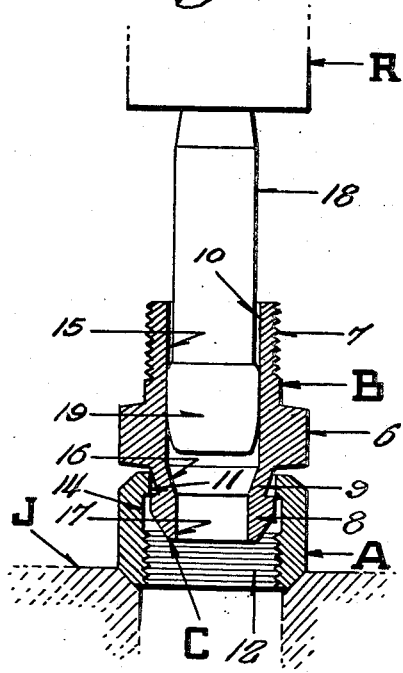
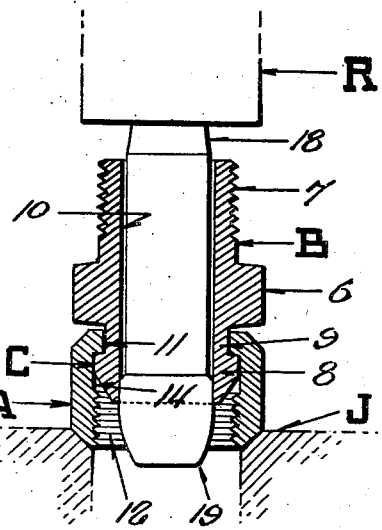
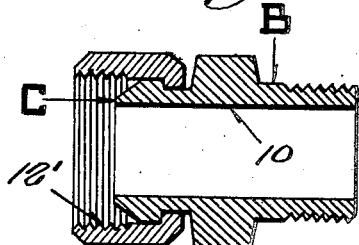
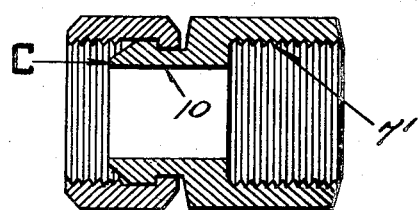
Inventor
Charles L. Conroy
By
Attorney Patented Mar. 11, 1947

2,417,350

UNITED STATES PATENT OFFICE 2,417,350

METHOD OF MANUFACTURE OF AN ADAPTOR UNION

Charles L. Conroy, Libertyville, Ill.

Application March 30, 1944, Serial No. 528,701

1 Claim. (Cl. 29—148.2)

This invention pertains generally to a method of manufacture of an adaptor union for hose couplings.

More particularly the invention is directed to a method of producing adapter unions of the type including either a male or female body member provided with a spud upon which a swivel nut is permanently assembled for attachment to a coupling provided on the end of a hose.

The common practice at the present time is to provide a separate spud secured in the body member after assembly of the swivel nut, by threading, swaging, brazing or other methods.

However, aside from the excessive cost of manufacture, the connections between the spud and body member in unions of the foregoing type have proved to be insecure and frequently result in leakage.

Also adapter unions having an integral spud and body member have been produced, but, as far as is known, in all such structures the swivel nut is permanently assembled on the spud by either clamping dies, rolling, or the use of separate interlocking element, such as a split ring. These methods of assembly are slow and costly, and because of distortion of the swivel nut in contracting the same on the spud, or the necessarily restricted size of the separate locking element, such structures are weak and result in frequent failures.

It is therefore the primary object of the present invention to overcome the foregoing objections by the provision of an exceedingly simple, and novel method of manufacture of an adaptor union including a body member provided with a head having an integral spud at one end and a swivel internally flanged nut permanently assembled on said spud, said spud including a neck and a conical head.

With the above and other objects in view, which will appear as the description proceeds, the invention resides in the novel construction, combination, arrangement of parts, and method, substantially as hereinafter described, and more particularly defined by the appended claim, it being understood that such changes in the precise embodiment of the herein disclosed invention may be made as come within the scope of the claim.

In the accompanying drawing is illustrated one complete example of the physical embodiment of the present invention constructed according to the best mode so far devised for the practical application of the principles thereof.

In the drawing:

Fig. 1 is a longitudinal sectional view of an adapter union constructed in accordance with the present invention, and illustrates a simple type of apparatus that may be used in carrying out the present novel method, the parts being shown in their relative positions prior to permanent attachment.

Fig. 2 is a similar view of a completed union.

Fig. 3 is a longitudinal sectional view of an adapter union including a modified form of swivel nut.

Fig. 4 is a similar view illustrating a female body member; and

Fig. 5 illustrates one form of the present adapter union applied to a conventional coupling attached to the end of a hose.

Referring now more particularly to the accompanying drawing, all of the adapter units illustrated include a swivel nut A, and a body member B provided with an integral spud C. With the exception of the union shown in Fig. 4, the body member B includes an enlarged tool engaging head 6, and an externally threaded end 7 for attachment to any desired fitting or equipment, while the integral spud C is formed on the opposite end.

The spud C consists of a conical head 8 and a restricted neck 9. In its completed form a straight bore 10 extends through the body and spud. The swivel nut in all forms illustrated includes an internal flange 11, which surrounds the spud shank 9 to allow free rotation on the same, while the head 8 of the spud serves to hold the nut in permanent assembled position. The opposite end of the nut A is provided with an internal thread 12 for attachment to the threaded end of a coupling 13 attached to the end of a hose H, in the manner shown in Fig. 5.

As shown in Figs. 1, 2 and 4 an internal annular recess 14 is formed in the nut A between the flange 11 and the projected threads 12, while in that form shown in Fig. 3, the internal threads 12' are cut into the wall of the nut beyond its inner surface, thus eliminating the recess. The later type of nut is employed in unions of larger diameter, in which there is relatively greater permissible expansion of the spud C, while the recessed nut is used on unions smaller in diameter in order to permit use of present standard threads in a minimum size nut.

The union shown in Fig. 4 includes a female body member B' provided at one end with internal threads 7' for attachment to a fitting, otherwise the structure is essentially the same as the male forms described, and either type of nut described may be utilized.

As shown in Fig. 5, when the nut A is threaded on the end of the hose coupling 13, the conical surface of the head 8 of the spud is drawn into a corresponding tapered seat formed in the end of the coupling to effect a ground seat between the coupling and spud, which affords a tight secure seal between the two.

Considering the present method of manufacture, reference will be had to Fig. 1, in which the body member B is shown in its initial condition prior to permanent assembly. In that state the enlarged portion 15 of the bore 10 extends only to the neck 9 of the spud, at which point it tapers inwardly at 16 to the restricted bore 17 formed in the head 8 of the spud.

In the condition described the spud C is inserted into the flanged end of the nut A, which is placed in a jig J to support the assembly. A pin 18 provided with an expending head 19 of substantially the same diameter as the enlarged portion 15 of the bore 10 is then inserted into the bore, and by means of a press ram R, or any suitable machine tool, the pin is forced downwardly through the body member as shown in Fig. 2, causing both the neck and head of the spud C to be expanded within the nut A for permanent assembly as heretofore explained. The pin can then be withdrawn or ejected downwardly through the jig J.

It will be noted that the gradual expansion of the spud is initiated at substantially the point of junction between the neck and body member, which results in maintaining the original angle of taper of the conical head thus eliminating necessity of subsequent machining.

From the foregoing explanation considered in connection with the accompanying drawing, it will be apparent that an extremely compact, inexpensive and durable adapter union has been provided, which offers no opportunity of blow-off or leakage under pressures for which it is designed.

Also, by the present novel method, cost of manufacture is reduced to a minimum, both in production of the parts and assembly, and maximum output is obtained.

In addition to the above advantages, it will also be noted that because of the straight bore provided, full capacity is obtained in a union of maximum compactness, whereas in certain types of unions in which the spud is formed separately and secured within the body member, either a restriction occurs or the body member must be increased in size to accommodate the spud and provide sufficient stock to withstand the stresses encountered, particularly when used on high-pressure hydraulic hose.

I claim:

The method of manufacture of an adaptor union including a body member provided with a head having an integral spud at one end and a swivel internally flanged nut permanently asembled on said sput, said spud including a neck and conical head; said method consisting of initially forming the boy member with a longitudinal bore restricted within said spud, said restriction being tapered within the neck portion and straight within the conical head portion, the outer periphery of the neck being conical to conform to the tapered bore within the neck, then inserting the spud into the flanged end of the swivel nut with the body head supported on the nut, which nut is supported in a jig to serve as a holding die for the body member, then gradually expanding the spud radially within the nut by means of a pin starting at the enlarged end of the tapered portion of the bore and proceeding outwardly through the straight restricted portion in the spud head to retain the nut against longitudinal movement on the neck of the spud, producing a continuous straight bore through the body and spud, and substantially retaining the original angle of taper of the conical head.

CHAS. L. CONROY.

REFERENCES CITED

The following references are of record in the file of this patent:

UNITED STATES PATENTS

| Number | Name | Date |
| --- | --- | --- |
| 1,794,849 | Hagstedt | Mar. 3, 1931 |
| 1,244,925 | Wahl | Oct. 30, 1917 |
| 1,450,126 | Wilson | Mar. 27, 1923 |
| 964,579 | Stephens | July 19, 1910 |
| 1,729,483 | Koch | Sept. 24, 1929 |
| 998,587 | Mueller | July 18, 1911 |